United States Patent [19]
Abe

[11] Patent Number: 5,296,992
[45] Date of Patent: Mar. 22, 1994

[54] THIN FILM MAGNETIC HEAD HAVING INCREASED CORE CROSS SECTION

[75] Inventor: Iwao Abe, Kanagawa, Japan

[73] Assignee: Sony Corporation, Tokyo, Japan

[21] Appl. No.: 729,555

[22] Filed: Jul. 15, 1991

[30] Foreign Application Priority Data

Jul. 17, 1990 [JP] Japan .................................. 2-188224

[51] Int. Cl.⁵ .............................................. G11B 5/147
[52] U.S. Cl. .................................................... 360/126
[58] Field of Search ................................ 360/126, 125

[56] References Cited

U.S. PATENT DOCUMENTS 4,601,099 7/1986 Nishiyama .
5,016,342 5/1991 Pisharody ...................... 360/121 X

FOREIGN PATENT DOCUMENTS 0006269 1/1980 European Pat. Off. .
0152064 8/1985 European Pat. Off. .
4020206 1/1991 Fed. Rep. of Germany .
62-270015 11/1987 Japan .
1-229413 9/1989 Japan .
2-76111 3/1990 Japan .

*Primary Examiner*—A. J. Heinz
*Attorney, Agent, or Firm*—Hill, Steadman & Simpson

[57] ABSTRACT

Thin film type magnetic transducer head is disclosed in which a track width recorded on a magnetic recording medium is determined by a thickness of thin film magnetic core halves formed on a non-magnetic substrate. The head has a rear core portion having a larger thickness than the track width forming portion of the head facing to the travelling magnetic recording medium, and a coil wound around the rear core portion. The coil comprises first coil portions underlying the rear core portion and second coil portions overlying the rear core portion and third coil portions connecting the first and the second core portions. The head is manufactured by thin film forming technique in combination with photolithography.

2 Claims, 11 Drawing Sheets

THIN FILM MAGNETIC HEAD HAVING INCREASED CORE CROSS SECTION

BACKGROUND OF THE INVENTION

The present invention relates to a magnetic head for use in combination with a video tape, a hard disk or a floppy disk, and to a method of fabricating such a magnetic head.

In the magnetic recording field, reduction in the magnetic head gap of a magnetic head has been required to deal with increase in recording density in recording data on recording tacks of a recording medium. The applicant of the present patent application has previously proposed a thin-film magnetic head for recording data on narrow tracks, having a magnetic core formed of a film of a thickness equal to the track width. This previously proposed thin-film magnetic head comprises, as shown in FIG. 3, a nonmagnetic substrate 1, a thin-film magnetic path 5 having a thickness equal to the track width, having a magnetic head gap g, and formed by forming a first thin-film magnetic core 3 of a thickness equal to the track width on the nonmagnetic substrate 1, forming a second thin-film magnetic core 4 of a thickness equal to that of the first thin-film magnetic core 3 on the nonmagnetic substrate 1 with a gap spacer 2 formed between the opposite side surfaces of the first thin-film magnetic core 3 and the second thin-film magnetic core 4, and a protective plate 6 put on the first thin-film magnetic core 3 and the second thin-film magnetic core 4 (Japanese Patent Laid-open (Kokai) No. Hei 2-14411). Most thin-film magnetic heads having magnetic cores formed of films of a thickness equal to the track width are provided, similarly to a bulk head, with a wound coil 6 as shown in FIG. 3 or a spiral coil, which is employed generally in conventional thin-film magnetic head.

A magnetic head 10 as shown in FIG. 4 has been applied to practical use in combination with a hard disk. The magnetic head 10 has a floating slider 8, and a thin-film magnetic head element 9 formed on one end surface of the slider 8 and having a thin-film magnetic core formed so that the direction of its thickness is perpendicular to the direction of the track width.

The thin-film magnetic head 7 shown in FIG. 3 is capable of coping with the reduction of the track width. However, the wound coil similar to that for a bulk head requires a troublesome coil winding operation, needs a large winding aperture 11 to form a wound coil of a large capacity and increases the length of the magnetic path, which affects adversely the improvement of the efficiency of the thin-film magnetic head. The spiral coil formed of a thin-film conductor increases dc resistance entailing problems attributable to noise.

In the magnetic head 10 of FIG. 4 employing the thin-film magnetic head element 9, the direction of the track width is perpendicular to the direction of the thickness of the film forming the magnetic core. Such a construction entails difficulty in controlling the magnetic domain taking into consideration wiggle to deal with a narrow track.

OBJECT AND SUMMARY OF THE INVENTION

Accordingly, it is an object of the present invention to provide a magnetic head solving problems attributable to the reduction of the track width and suitable for high-density recording, and to provide a method of such a magnetic head.

The present invention provides a magnetic head having a substrate, a thin-film magnetic path having a magnetic head gap g formed on the substrate by a film having a thickness equal to the gap width, and a wound coil formed of thin-film conductors around the thin-film magnetic path. The thickness of the rear portion of the thin-film magnetic path is greater than that of the front portion of the same having the magnetic head gap.

The present invention provides a magnetic head having a thin-film magnetic path having a magnetic head gap g and formed of a film of a thickness equal to the track width, the opposite sides of the sliding surface, in which the magnetic head gap g of the thin-film magnetic path opens, with respect to the direction of the track width being inclined backward, and the sliding surface being curved with respect to the sliding direction.

The present invention provides a magnetic head having a slider, and a thin film magnetic head element having a thickness equal to the track width and provided on a side surface of the slider extending along the direction of running of the slider relative to a recording medium.

The present invention provides a method of fabricating a magnetic head, comprising steps of forming lower thin-film conductors over the surface of a substrate, forming a thin-film magnetic path, having a thickness equal to the track width and having a rear portion having a thickness greater than that of a front portion in which a magnetic head gap is formed, over the surface of the substrate including the lower thin film conductors, forming side thin-film conductors having a thickness equal to that of the rear portion of the thin-film magnetic path so as to be connected to the thin-film magnetic path, and forming upper thin-film conductors over the thin-film magnetic path so as to be connected to the side thin-film conductors. The lower thin film conductors, the side thin-film conductors and the upper thin-film conductors are formed so as to form a wound coil.

In the magnetic head in the first aspect of the invention, the thin-film magnetic path is formed of a film having a thickness equal to the track width to deal with operation in combination with a recording track having a narrow track width. The construction of the magnetic head, as compared with a conventional construction in which the direction of thickness of a film forming the thin-film magnetic path is perpendicular to the direction of the track width, has less difficulty in the control of the magnetic domain. Since the thickness of the rear portion of the thin-film magnetic path is greater than the front portion of the same having the magnetic head gap, the thin-film magnetic path has an increased sectional area, which improves the efficiency of the magnetic head. Since the wound coil is a helical coil formed of the thin-film conductors, the wound coil has a dc resistance lower than that of the conventional spiral coil and reduces noise. Accordingly, the magnetic head is excellent in operation in combination with a recording track having a narrow track width, has a low inductance and a compact construction and is capable operating at a high efficiency.

In the magnetic head in the second aspect of the present invention, the opposite sides of the sliding surface with respect to the direction of the track width are inclined backward and the sliding surface is curved with respect to the direction of sliding movement.

Therefore, the sliding surface is able to be in satisfactory sliding contact with a recording medium having a narrow track width for satisfactory high-density recording. Since the magnetic head has a sufficiently large thickness and a sufficiently high mechanical strength to facilitate handling.

In the magnetic head in the third aspect of the present invention, the thin-film head element is formed of a film having a thickness equal to the track width on the side surface of the slider extending along the direction of running relative to a recording medium. This construction facilitates the control of the magnetic domain and enables the reduction of the track width. Thus, the magnetic head is suitable for high-density recording on a hard disk.

In the method of fabricating a magnetic head in the fourth aspect of the present invention, the thin-film magnetic path is formed of a film having a thickness equal to the track width, the thin-film conductors are formed sequentially on the rear portion having an increased thickness of the thin-film magnetic path to form the helical wound coil. Thus the method is capable of readily fabricating a thin-film magnetic head capable of operating in-combination with a recording track having a narrow track width, having a low inductance and a compact construction and capable operating at a high efficiency.

DESCRIPTION OF THE PREFERRED EMBODIMENTS

A thin-film magnetic head in a first embodiment according to the present invention and a method of fabricating the same will be described with reference to FIGS. 1A to 1M.

Figure 1A:
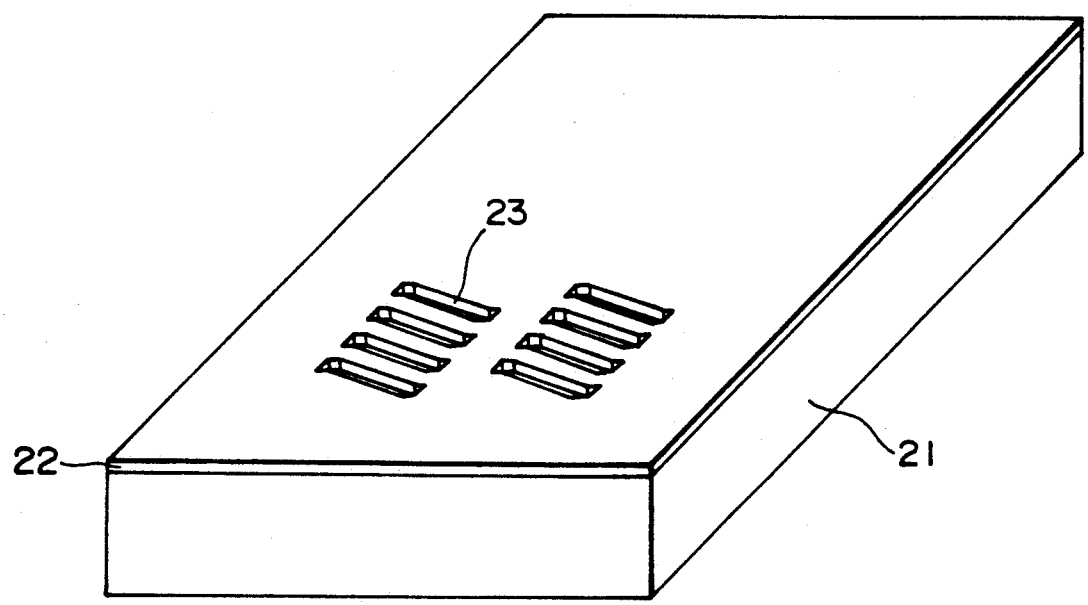
FIGS. 1A to 1M are perspective views of assistance in explaining steps of fabricating a magnetic head in a first embodiment according to the present invention.
Figure 1B:
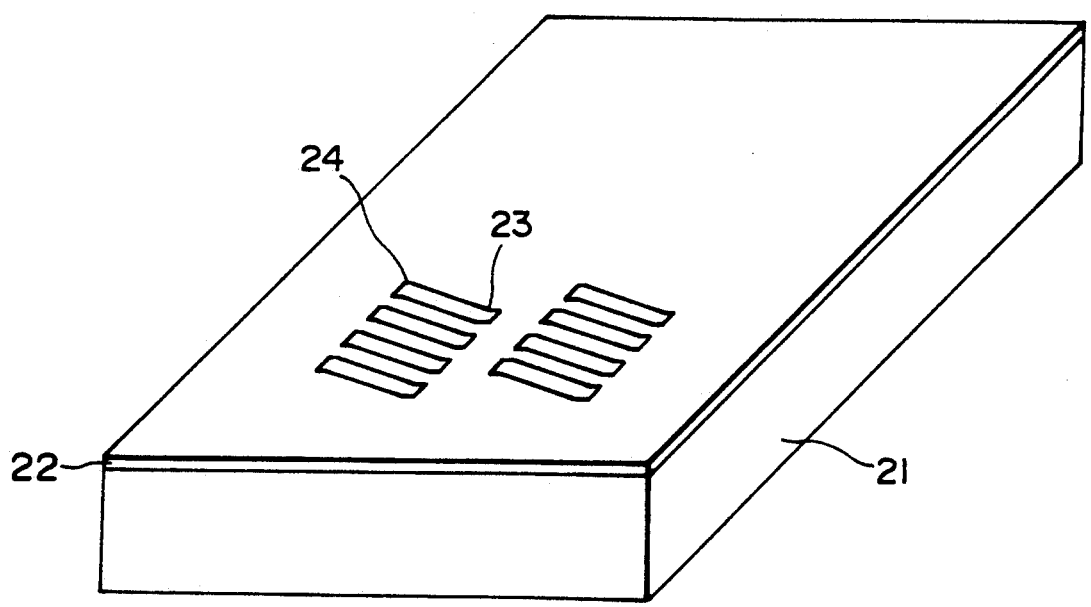

Referring to FIG. 1A, an insulating film 22, such as a $SiO_2$ film, is formed over a substrate 21 formed of a nonmagnetic material, such as potassium titanate, barium titanate or alumina-titanium carbide ceramics, by a thin-film forming process, such as a sputtering process in a thickness corresponding to that of lower thin-film conductors forming a portion of a wound coil, which will be described afterward. Then, a plurality of grooves 23 for lower thin-film conductors are formed through the insulating film 22 by a photolithographic process and an etching process, such as a RIE (reactive ion etching) process or an ion etching process. The number of the grooves 23 is equal to the number of turns of the conductor of the wound coil.

Then, a conductive film, such as a Cu film or an Al film, is formed over the entire surface of the substrate including the grooves 23 by a thin-film forming process, such as a sputtering process or a plating process in a thickness not less than the depth of the grooves 23. Then, the conductive film is polished flat by lapping to leave only portions of the conductive film filling up the grooves 23 so that lower thin-film conductors 24 are formed.

Figure 1C:
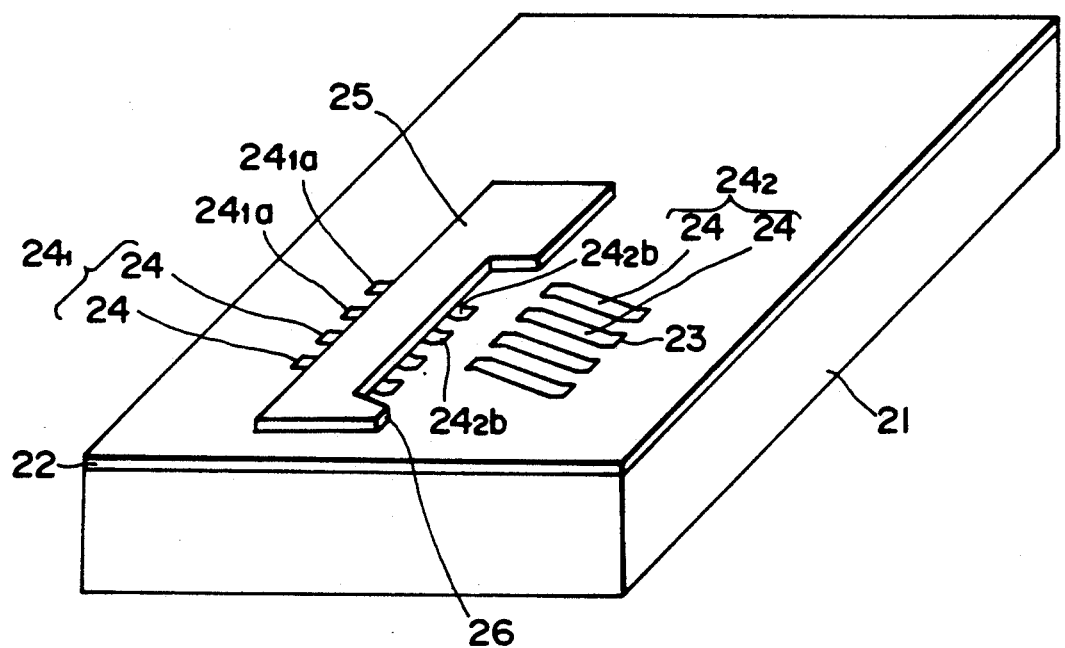

Then, an insulating film, such as a $SiO_2$ film or an $Al_2O_3$ film, not shown, is formed over the entire surface of the substrate to insulate the lower thin-film conductors 24 from a magnetic core, which will be described afterward. Then, a magnetic thin film, such as a Sendust (Fe-Al-Si alloy) film or an amorphous magnetic film, is formed over the entire surface of the insulating film formed on the substrate. The magnetic thin film is formed in a thickness greater than a desired track width, namely, a thickness including a machining allowance in addition to the thickness of the track width to finish the magnetic thin film in a thickness equal to the track width in the subsequent process. Then, as shown in FIG. 1C, the magnetic thin film is etched by an etching process or the like to form a first thin-film magnetic core 25 having a shape substantially resembling the letter U so that a gap forming surface 26 is formed in a desired accuracy and so as to conform to a desired azimuth angle. The first thin-film magnetic core 25 is formed across one row of the lower thin-film conductors $24_1$ so that the opposite ends $24_1a$ and $24_1b$ of the lower thin-film conductors $24_1$ extend outside the thin-film magnetic core 25.

Figure 1D:
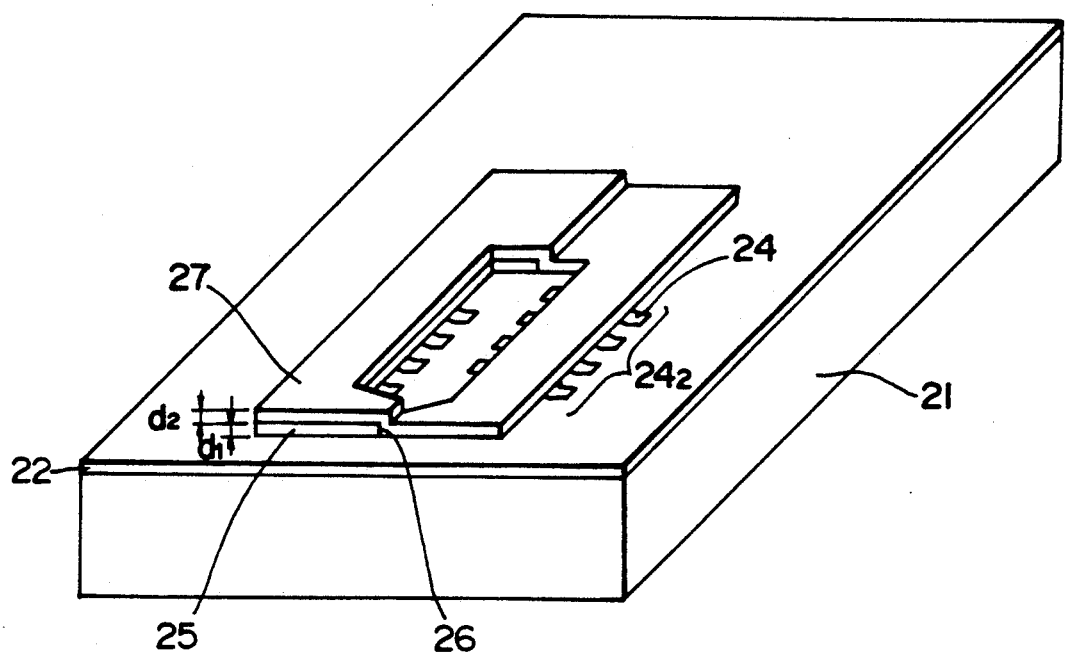

A gap spacer, not shown, of $SiO_2$ or the like is formed contiguously with the gap forming surface 26 in a thickness corresponding to a gap length by a sputtering process or the like. Then, the same magnetic thin film as the foregoing magnetic thin film is formed over the entire surface of the substrate, and then the magnetic thin film is etched by a photolithographic process and an etching process to form a second thin-film magnetic core 27 extending over the first thin-film magnetic core 25 as shown in FIG. 1D.

The second thin-film magnetic core 27 is formed across the other row of lower thin-film conductors $24_2$ so that the opposite ends $24_2a$ and $24_2b$ of the lower thin-film conductors 24 extend outside the second thin-film magnetic core 27.

The thickness $d_2$ of the second thin-film magnetic core 27 is equal to the thickness $d_1$ of the first thin-film magnetic core 25, namely, $d_1=d_2$.

Figure 1E:
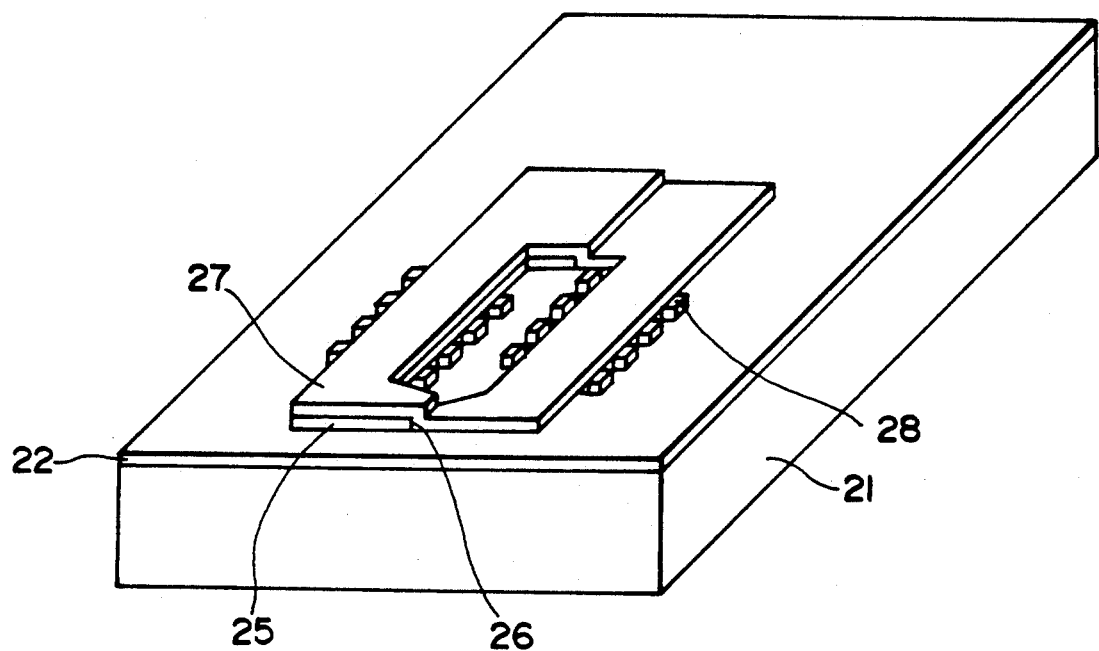

Then, after removing a portion of the insulating film to expose the opposite ends $24_1a$, $24_1b$, $24_2a$ and $24_2b$, side thin-film conductors 28 are formed on the opposite ends $24_1a$, $24_1b$, $24_2a$ and $24_2b$ of the lower thin-film conductors 24 as shown in FIG. 1E. The side thin-film conductors 28 are formed by a pattern plating process or by patterning a conductive film, such as a Cu film or an Al film, by a photolithographic process and an etching process. The thickness of the side thin-film conductors 28 is equal to that of the first thin-film magnetic core 25 and the second thin-film magnetic core 27.

Figure 1F:
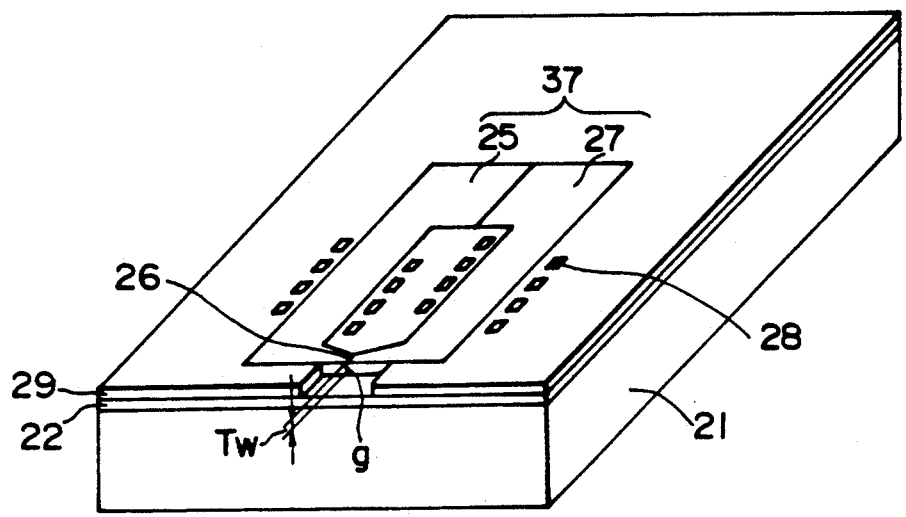

Then, as shown in FIG. 1F, an insulating film 29 of an insulating material, such as $Al_2O_3$ or $SiO_2$, is formed over the entire surface of the substrate by a thin film forming process, such as a CVD (chemical vapor deposition) process or a sputtering process, in a thickness greater than that of the first thin-film magnetic core 25. Then, the surface of the work is polished in a flat surface so that the first thin-film magnetic core 25 and the second thin-film magnetic core 27 are lapped in a thickness equal to a predetermined track width Tw.

Thus, the first thin-film magnetic core 25 and the second thin-film magnetic core 27 form a magnetic path 37 having a magnetic head gap g. The thickness of the thin-film magnetic cores 25 and 27 corresponds to the track width Tw.

Figure 1G:
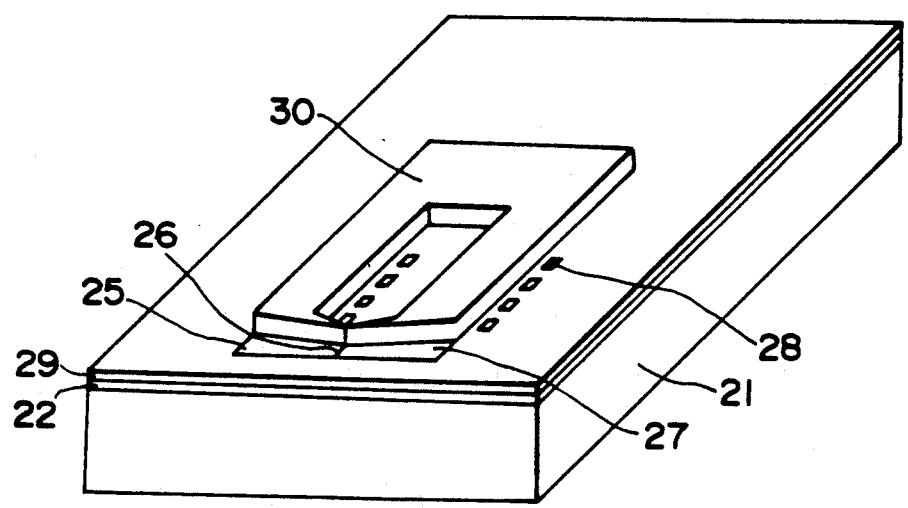

Then, as shown in FIG. 1G, an auxiliary magnetic core 30 is formed on the magnetic path in an area behind the magnetic head gap g to enhance the head efficiency. The auxiliary magnetic core 30 is formed by forming a magnetic thin film of a material having high magnetic characteristics, such as Sendust alloy or an amorphous magnetic material, over the entire surface of the substrate in an appropriate thickness taking into consideration the head efficiency, and patterning the magnetic thin film by a photolithographic process and an etching process. The auxiliary magnetic core 30 has a discontinued portion near the magnetic head gap g to avoid magnetically short-circuit of the magnetic cores 25 and 27.

Figure 1H:
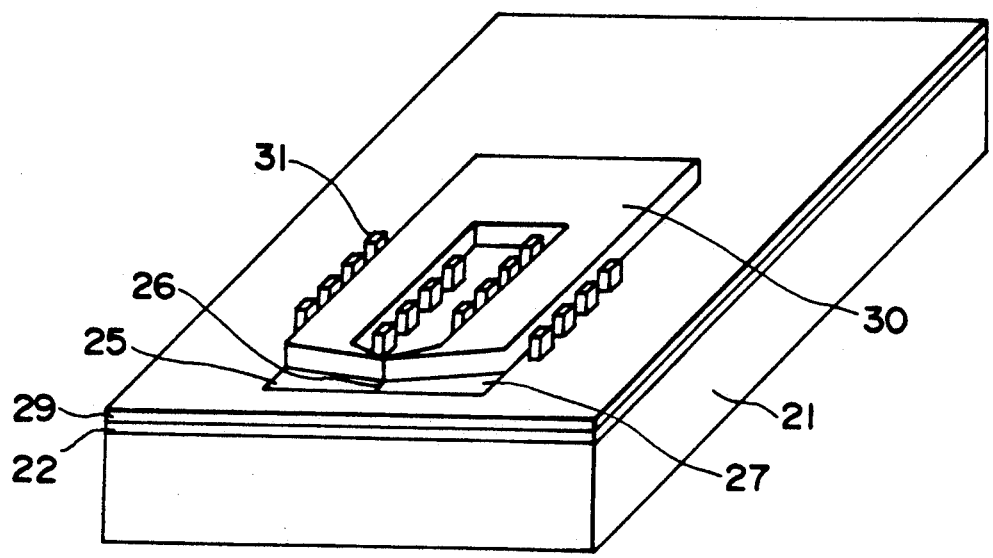

Then as shown in FIG. 1H, second side thin-film conductors 31 are formed on the first side thin-film conductors 28 in a thickness corresponding to that of the auxiliary magnetic core 30 by the same processes as those employed in forming the side thin-film conductors 28 shown in FIG. 1E.

Figure 1I:
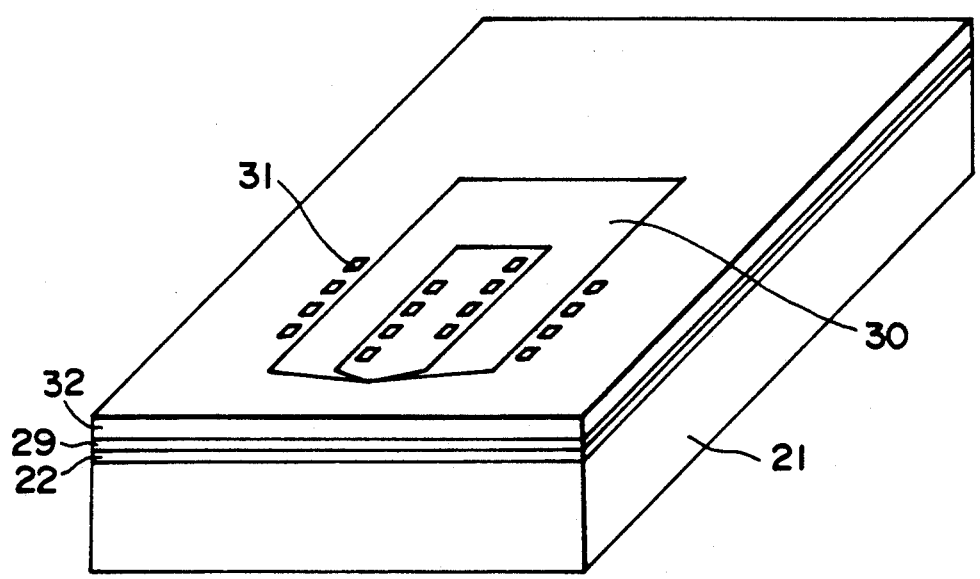

Then, as shown in FIG. 1I, the thickness of the auxiliary magnetic core 30 is adjusted by flattening, in which a film 32 of $Al_2O_3$ or $SiO_2$ is formed over the entire surface of the substrate by a sputtering process or the like, and then the surface of the work is lapped to form the auxiliary magnetic core in a desired thickness.

Figure 1J:
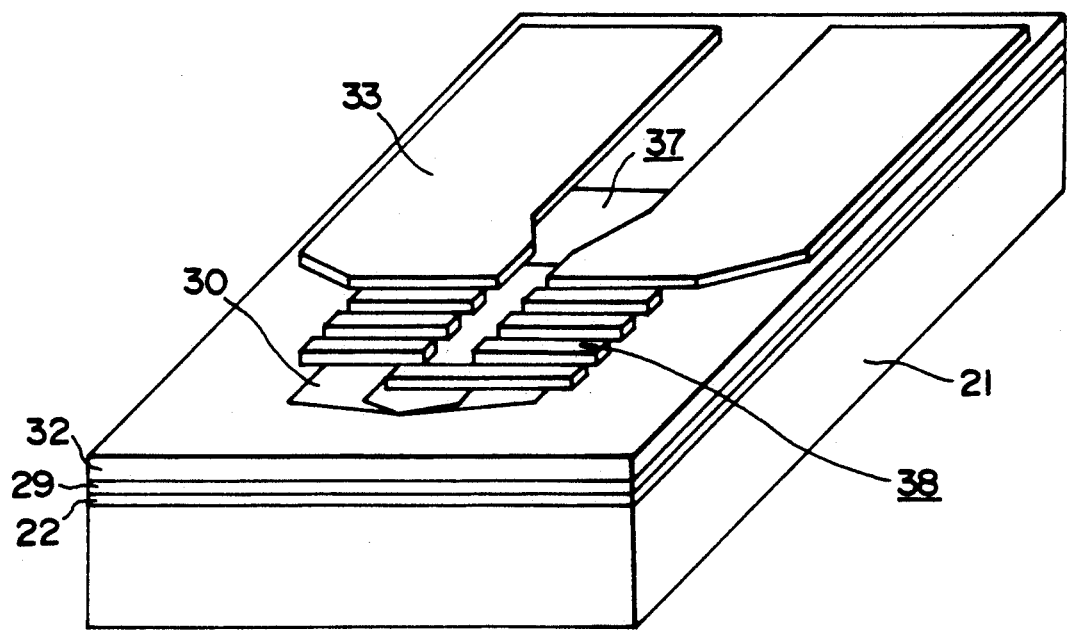

Then, an insulating film, such as a $SiO_2$ film, not shown, is formed over the entire surface of the substrate to insulate the auxiliary magnetic core 30, and then portions of the insulting film covering to the second side thin-film conductors 31 are removed by a photolithographic process and an etching process. Subsequently, a conductive film, such as a Cu film or an Al film, is formed over the entire surface of the substrate by sputtering or the like, and the conductive film is patterned by a photolithographic process and an etching process to form upper thin-film conductors 33 connected to the side thin-film conductors 31, respectively, and extending across the auxiliary magnetic core 30. Thus, a wound coil 38 wound around the thin-film magnetic path 37 is formed by the lower thin-film conductors 24, the first side thin-film conductors 28, the second side thin-film conductors 31 and the upper thin-film conductors 33 as shown in FIG. 1J.

Figure 1K:
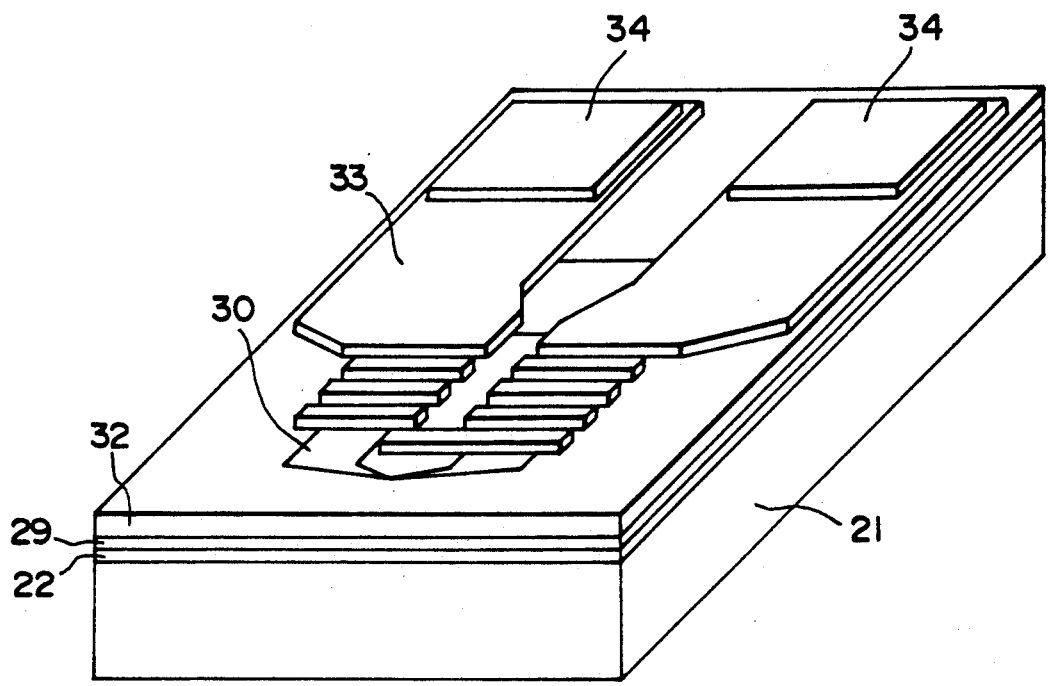

Then, as shown in FIG. 1K, a thin-film conductor is formed only in terminal portions 34 to facilitate forming the terminals of the coil in flattening the upper thin-film conductors 33.

Figure 1L:
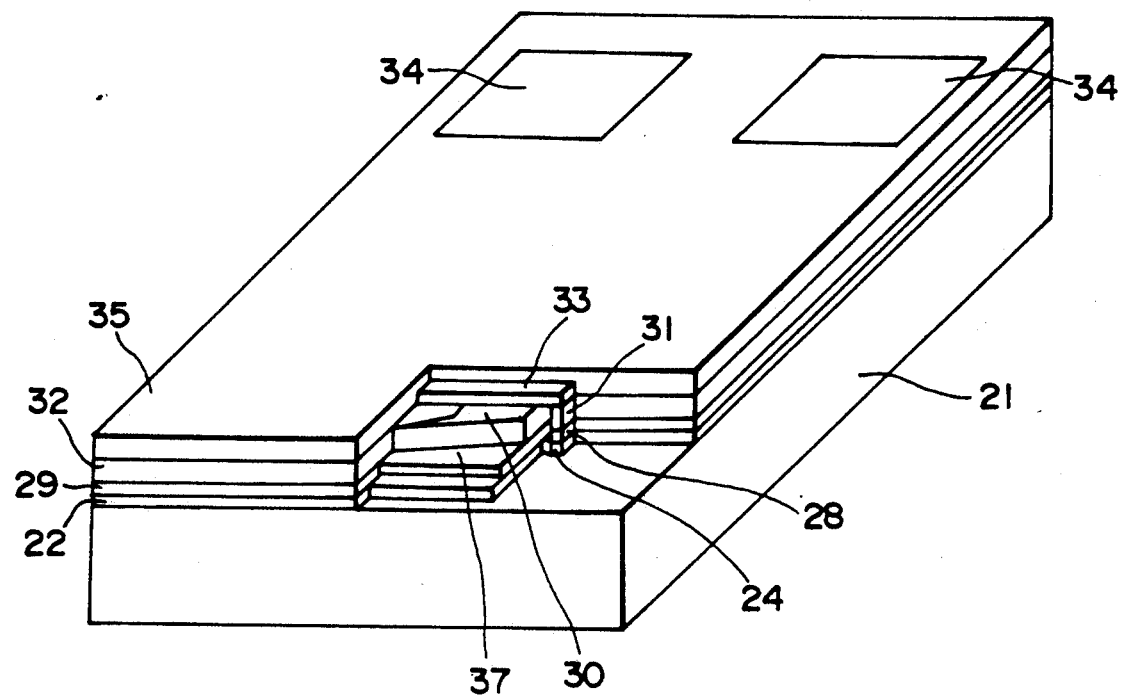

Then, as shown in FIG. 1L, a film 35 of $Al_2O_3$ or $SiO_2$ for flattening the upper thin-film conductors 33 is formed by sputtering or the like, and then the film 35 is polished by lapping to expose the surface of the terminal portions 34.

Figure 1M:
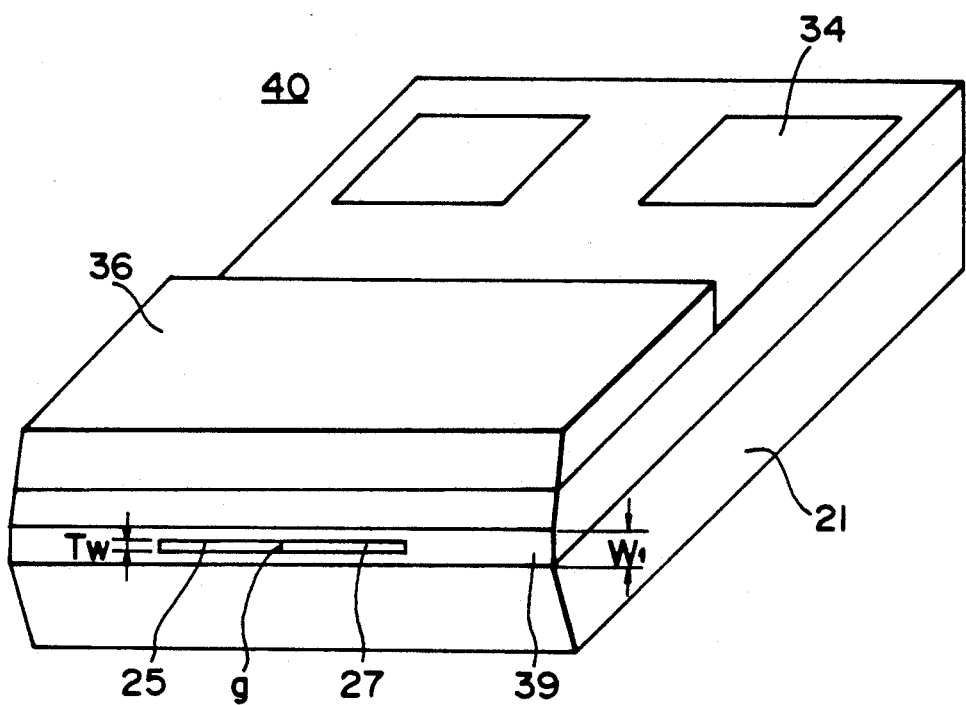

Then, as shown in FIG. 1M, a protective plate 36 is attached to the work, and then the end surface of the work is polished to finish a sliding surface 39 having the magnetic head gap g corresponding to the track width Tw defined by the thickness of the thin-film magnetic cores 25 and 27. The upper and lower portions of the sliding surface 39, namely, portions formed by the substrate 21 and the protective plate 36, with respect to the direction of the track width on the opposite sides of the central portion of a width $W_1$ are inclined backward, and the sliding surface 39 is curved with respect to the direction of sliding movement so that a portion of the sliding surface 39 including the magnetic head gap g has a convex shape. Thus, a thin-film magnetic head 40 is completed.

In the thin-film magnetic head 40 thus fabricated, the track width Tw of the magnetic head gap g is defined by the thickness of the thin-film magnetic cores 25 and 27, and hence the thin-film magnetic head 40 can be formed in a construction suitable for operation in combination with a recording medium having a narrow width tracks. The dc resistance of the helical wound coil 38 formed by depositing the thin-film conductors 24, 28, 31 and 33 is lower than the spiral coil of the conventional thin-film magnetic head.

Furthermore, since the magnetic cores are formed of magnetic thin films of a metal having excellent magnetic characteristics, and the wound coil 38 is wound around the rear portion of the magnetic path provided with the auxiliary magnetic core 30 and having a thickness greater than the front portion of the magnetic path in which the magnetic head gap g is formed, the magnetic head operates at an improved efficiency.

Still further, since the upper and lower portions of the sliding surface 39 on the opposite sides of the narrow central portion including the magnetic head gap g are inclined backward and the narrow central portion of the sliding surface 39 is formed in a convex shape, the magnetic head is able to be brought into contact satisfactorily with a recording medium having a narrow track width for satisfactory high-density recording. Since the magnetic cores 25 and 27 are protected by the substrate 21 and the protective plate 36, and the magnetic head has a sufficiently large thickness, the magnetic head has a sufficiently high mechanical strength and is easy to handle.

Accordingly, the thin-film magnetic head 40 is capable of coping with the reduction of the track width, has a low inductance and a compact construction, and is capable of operating at a high efficiency.

The method of fabricating the magnetic head 40 determines the track width Tw by the thickness of the film forming the thin-film magnetic cores 25 and 27, forms the helical wound coil 38 by forming the side thin-film conductors 28 and 31 in a thickness corresponding to the thickness of the film forming the auxiliary magnetic core 30 on the lower thin-film conductors 24 and forming the upper thin-film conductors 33 so as to be connected to the side thin-film conductors 31. Thus, the method is capable of fabricating the magnetic head capable of coping with the reduction of the track width, having a low inductance and a compact construction and capable of operating at a high efficiency.

A magnetic head in a second embodiment according to the present invention for use in combination with a hard disk, and a method of fabricating the same will be described with reference to FIGS. 2A to 2E.

Figure 2A:
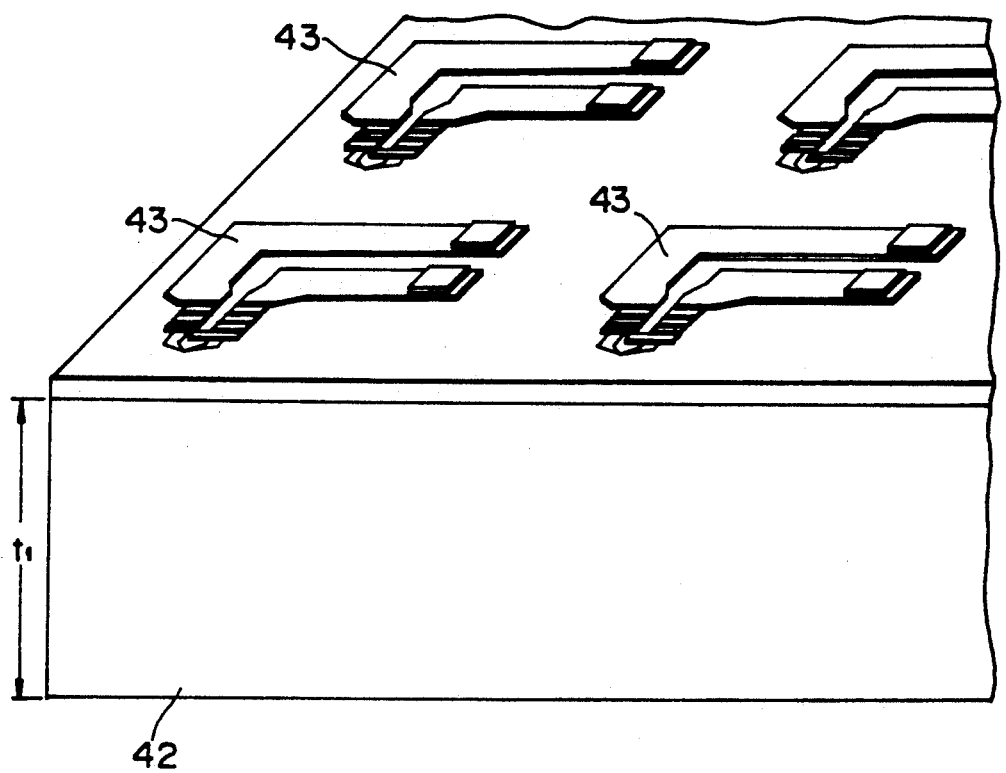
FIGS. 2A to 2E are perspective views of assistance in explaining steps of fabricating a magnetic head in a second embodiment according to the present invention.

Referring to FIG. 2A, a plurality of thin-film magnetic head elements 43 each having thin-film magnetic cores formed of a film of a thickness corresponding to a track width Tw are formed at equal intervals on a nonmagnetic substrate 42 formed of a nonmagnetic material, such as potassium titanate, barium titanate or Al.-TiC (alumina-titanium carbide ceramics), and having a thickness $t_1$ corresponding to slider width. The thin-film magnetic head elements 43 are arranged in the surface of the substrate 42 taking into consideration the slider length and the slider thickness. The thin-film magnetic head elements 43 are formed by the steps of the method of fabricating the thin-film magnetic head 40 previously described with reference to FIGS. 1A to 1K.

Figure 2B:
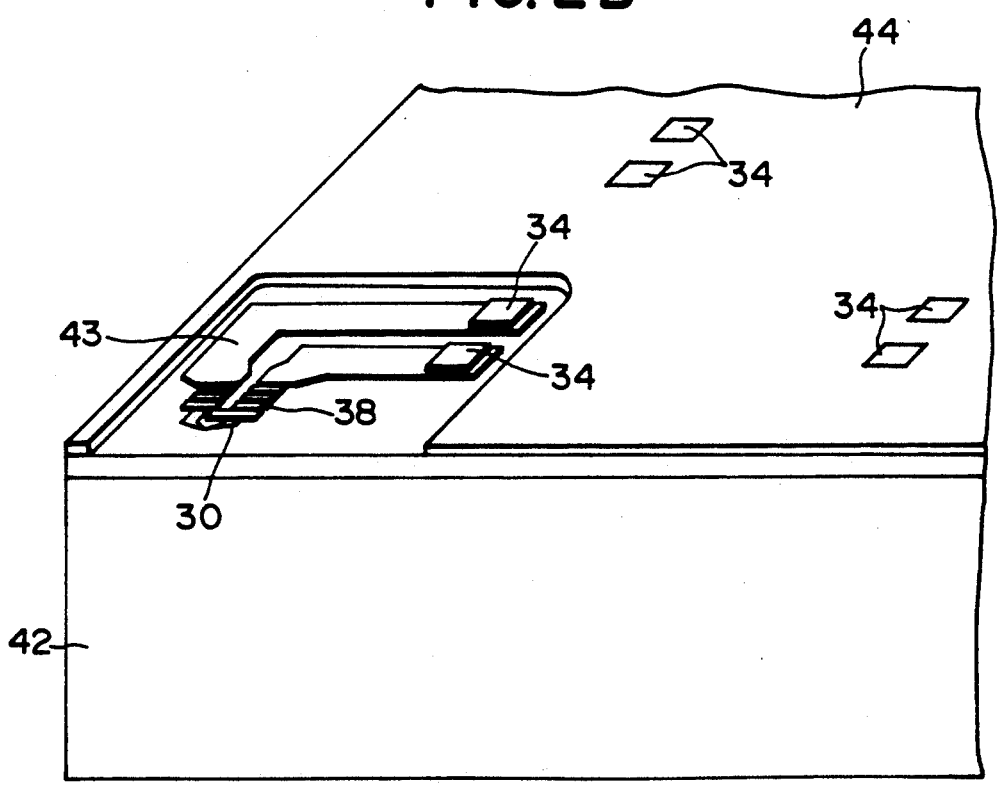

Then, as shown in FIG. 2B, a film 44 of Al$_2$O$_3$ or SiO$_2$ is formed by a thin film forming process, such as a sputtering process or a CVD process, and the film 44 is lapped in a flat surface so that terminal portions 34 are exposed. The lapping process determines a slider width t$_2$ (FIG. 2C).

Figure 2C:
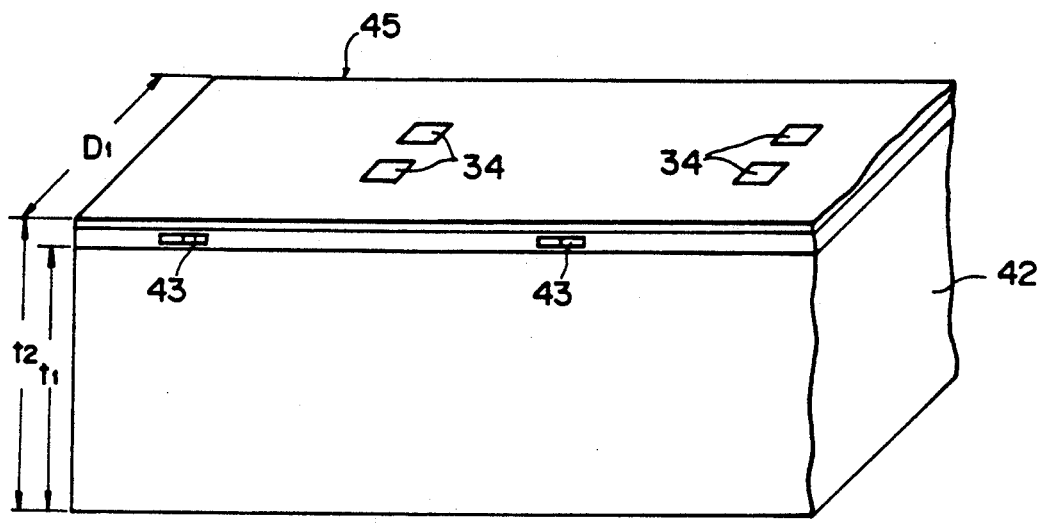

Then, as shown in FIG. 2C, the work is cut by machining to form a head block 45. In the head block 45, the magnetic head gaps g of the thin-film head elements 43 are exposed. The head block 45 has a thickness D$_1$.

Figure 2D:
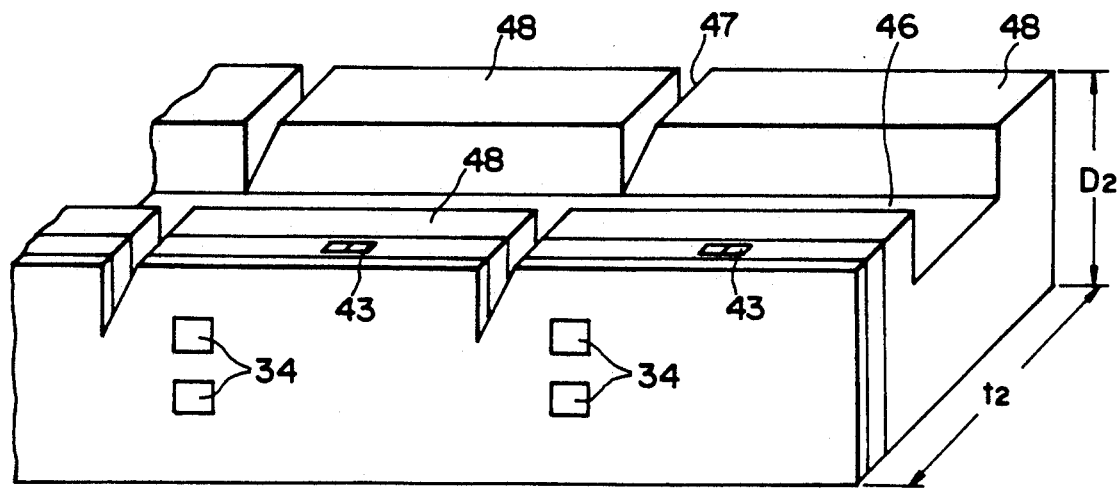

Then, as shown in FIG. 2D, a groove 46 determining the width of the rail of a slider, and taper grooves 47 determining the floating height of the slider are formed by machining or etching. Then, the surfaces 48 of the rails of the slider are finished by lapping or the like to form the head block 45 and simultaneously determining a desired gap depth in a thickness D$_2$.

Figure 2E:
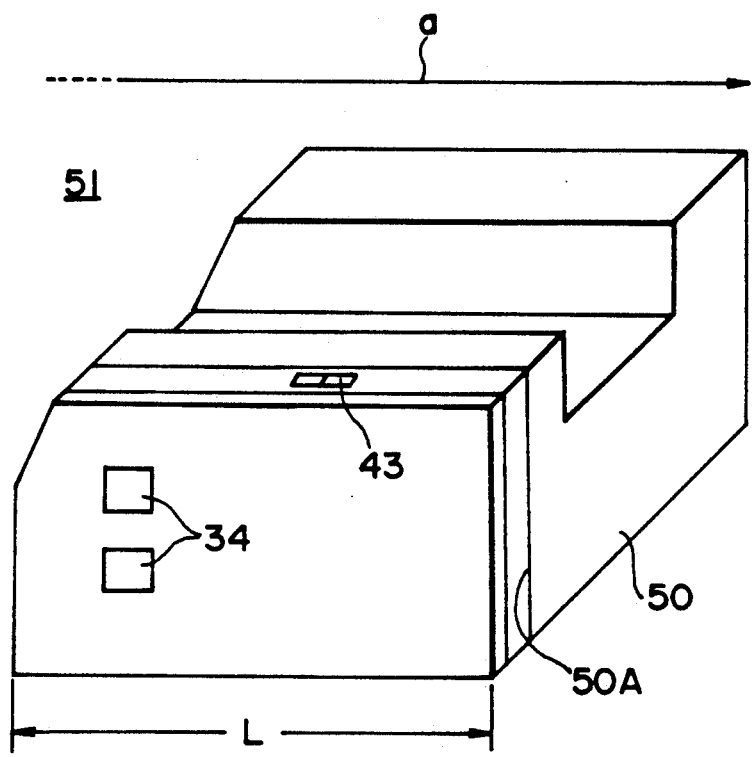
Figure 3:
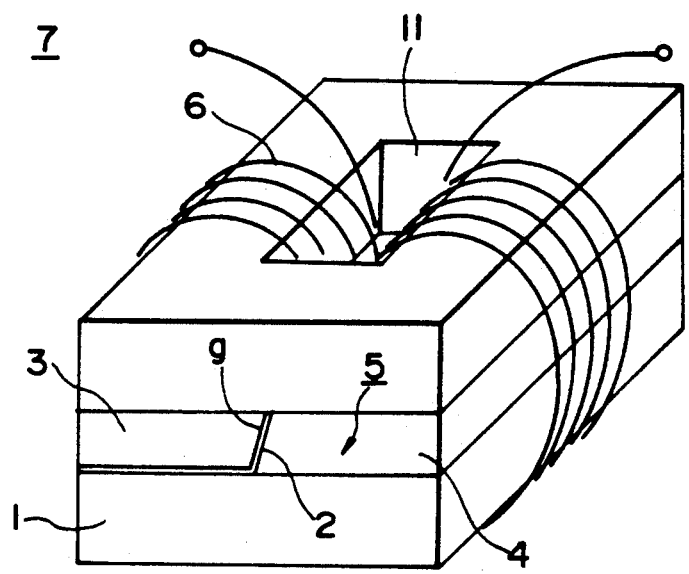
FIG. 3 is a perspective view of a conventional thin-film magnetic head.
Figure 4:
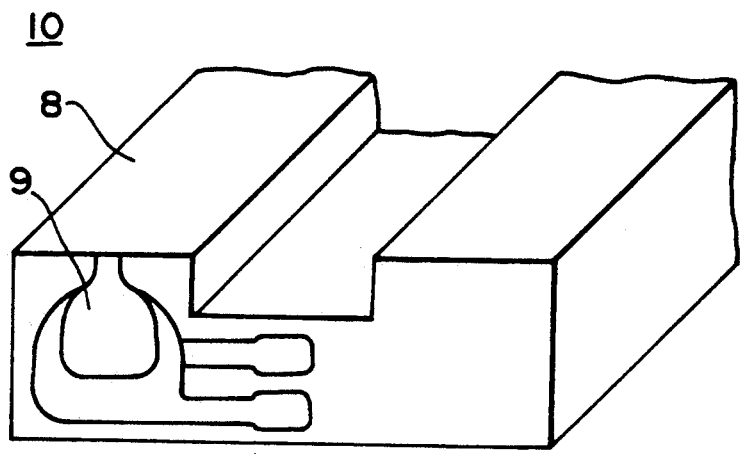
FIG. 4 is a perspective view of a conventional magnetic head for use in combination with a hard disk.

Then, the head block 45 is cut into individual sliders 50 having a length L. Thus, a magnetic head 51 consisting of the slider 50 and the thin-film magnetic head element 43 having the magnetic cores 25 and 27 formed of a film of a thickness corresponding to the track width is obtained so shown in FIG. 2E. In FIG. 2E the arrow a shows a relative travelling direction between the hard slider and the disk.

The magnetic head 51 for use in combination with a hard disk, integrally comprising the slider 50 and the thin-film magnetic head element 43 facilitates the control of the position of the thin-film magnetic head element 43 and can be formed in a high accuracy.

Since the thickness of the thin-film magnetic cores of the thin-film magnetic head 43 corresponds to the track width Tw, the magnetic head is capable of coping with the reduction of the track width and of operating for high-density recording.

As is apparent from the foregoing description, the present invention provides a thin-film magnetic head capable of being used in combination with a recording medium having a narrow track width for satisfactory recording operation, having a low inductance and a compact construction, and capable of operating at a high efficiency. The method in accordance with the present invention is capable of fabricating such a thin-film magnetic head.

Furthermore, the present invention provides a magnetic head integrally comprising a slider and a thin-film magnetic head element having a magnetic head gap exposed in the surface of a side surface of the slider extending along the direction of running of the slider relative to a recording medium. Thus, the magnetic disk for use in combination with a hard disk is capable of readily coping with the reduction of the track width and of operating for high-density recording.

We claim as our invention:

1. A thin film magnetic transducer comprising;
   a non-magnetic generally planar substrate,
   a first thin film magnetic core half formed on a first portion of said non-magnetic substrate,
   a second thin film magnetic core half formed on a second portion of said non-magnetic substrate adjacent said first core half to form a magnetic transducing gap between said first and second core halves at a surface of said head facing a travelling magnetic recording medium,
   said gap being elongated and extending transverse to the plane of the substrate,
   a coil wound around at least one of said first and second thin film magnetic core halves,
   said coil comprising a plurality of first coil portions underlying said one core half, a plurality of second coil portions overlying said one core half, and a plurality of third core portions connecting said first and said second coil portions to form said coil, said third coil portions being provided on said non-magnetic substrate at portions uncovered by said one core half;
   and a further core portion provided directly on and magnetically coupled to said first and second thin film magnetic core halves at a position remote from said magnetic gap.

2. A thin film magnetic transducer comprising;
   a non-magnetic substrate,
   a first thin film magnetic core half formed on a first portion of said non-magnetic substrate,
   a second thin film magnetic core half formed on a second portion of said non-magnetic substrate having a magnetic gap therebetween at a surface of said head facing a travelling magnetic recording medium,
   a coil wound around at least one of said first and second thin film magnetic core halves,
   said coil comprising a plurality of first coil portions underlying said one core half, a plurality of second coil portions overlying said one core half, and a plurality of third core portions connecting said first and said second coil portions to form said coil, said third coil portions being provided on said non-magnetic substrate at portions uncovered by said one core half;
   a layer of magnetic material overlying said core halves and said coil, electrical connection terminals provided on an outer surface of said layer, and conducting means interconnected between said terminals and said coil.

* * * * *